(12) United States Patent
Albers et al.

(10) Patent No.: US 12,226,978 B2
(45) Date of Patent: Feb. 18, 2025

(54) TRANSPARENT ROOF PANEL HAVING AN ISOLATED CENTER UNIT

(71) Applicant: Inalfa Roof Systems Group B.V., Oostrum (NL)

(72) Inventors: Thomas Anton Martijnszoon Albers, Venray (NL); Sander De Bie, Nuth (NL); Gerrit Schwepper, Kamp-Lintfort (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 252 days.

(21) Appl. No.: 17/666,927

(22) Filed: Feb. 8, 2022

(65) Prior Publication Data

US 2022/0255493 A1    Aug. 11, 2022

(30) Foreign Application Priority Data

Feb. 11, 2021   (EP) .................................... 21156668

(51) Int. Cl.
*B32B 3/24* (2006.01)
*B32B 3/26* (2006.01)
(Continued)

(52) U.S. Cl.
CPC ........ *B32B 17/10293* (2013.01); *B32B 3/266* (2013.01); *B32B 7/023* (2019.01);
(Continued)

(58) Field of Classification Search
CPC ... B32B 17/10293; B32B 3/266; H02S 40/34; H02S 10/40; B60J 7/00; B60R 16/02
(Continued)

(56) References Cited

U.S. PATENT DOCUMENTS 2,878,357 A * 3/1959 Thomson .......... B32B 17/10761
219/203
3,484,584 A * 12/1969 Shaw, Jr. ................... B60J 1/02
219/203
(Continued)

FOREIGN PATENT DOCUMENTS

BE           1019812 A3 * 1/2013    ....... B32B 17/10036
CN      106233065 A  * 12/2016    ........... B32B 15/043
(Continued)

OTHER PUBLICATIONS

Machine Translation of DE-102004039883-B3, Jun. 2006 (Year: 2006).*

(Continued)

*Primary Examiner* — Jeffrey A Vonch
(74) *Attorney, Agent, or Firm* — Steven M. Koehler; Westman, Champlin & Koehler, P.A.

(57) ABSTRACT

A transparent panel for use in a vehicle roof of a vehicle comprises a layered stack comprising a first and a second transparent pane and an electrically conductive assembly arranged between the second and the third main surface, wherein a through hole is provided in the second pane. The panel further comprises an electric apparatus mounted on a passenger compartment side covering the through hole. The electric apparatus is electrically coupled to the electrically conductive assembly through the through hole. The electrically conductive assembly electrically couples a first and a second terminal and is arranged between and adjacent to the first and the second terminals, wherein an optical transmissivity of the transparent panel is not visually deteriorated in an area of the electrically conductive assembly around the electric apparatus.

20 Claims, 5 Drawing Sheets

(51) Int. Cl.
| | |
|---|---|
| *B32B 5/14* | (2006.01) |
| *B32B 7/023* | (2019.01) |
| *B32B 7/12* | (2006.01) |
| *B32B 17/10* | (2006.01) |
| *B60J 1/00* | (2006.01) |
| *B60J 1/20* | (2006.01) |
| *B60J 7/04* | (2006.01) |
| *B60J 7/043* | (2006.01) |
| *B60Q 3/208* | (2017.01) |
| *B60R 16/02* | (2006.01) |
| *H02S 40/34* | (2014.01) |
| *H02S 10/40* | (2014.01) |

(52) U.S. Cl.
CPC .. *B32B 17/10036* (2013.01); *B32B 17/10192* (2013.01); *B32B 17/1022* (2013.01); *B32B 17/10376* (2013.01); *B32B 17/10385* (2013.01); *B60J 1/001* (2013.01); *B60J 1/008* (2013.01); *B60J 7/04* (2013.01); *B60J 7/043* (2013.01); *B60Q 3/208* (2017.02); *B60R 16/02* (2013.01); *H02S 40/34* (2014.12); *B32B 5/142* (2013.01); *B32B 17/1011* (2013.01); *B32B 17/10183* (2013.01); *B32B 17/10339* (2013.01); *B32B 17/1055* (2013.01); *B32B 2307/202* (2013.01); *B32B 2307/412* (2013.01); *B32B 2307/414* (2013.01); *B32B 2605/006* (2013.01); *B32B 2605/08* (2013.01); *B60J 1/20* (2013.01); *H02S 10/40* (2014.12); *Y10T 428/24322* (2015.01); *Y10T 428/24331* (2015.01); *Y10T 428/24802* (2015.01); *Y10T 428/24917* (2015.01); *Y10T 428/24926* (2015.01); *Y10T 428/24942* (2015.01)

(58) Field of Classification Search
USPC ............................................ 296/100.15, 215
See application file for complete search history.

(56) References Cited

U.S. PATENT DOCUMENTS

| | | | | |
|---|---|---|---|---|
| 3,529,074 | A * | 9/1970 | Lewis | B32B 17/10293 |
| | | | | 174/250 |
| 3,825,918 | A * | 7/1974 | Laidlaw, Jr. | G08B 13/04 |
| | | | | 109/21 |
| 3,866,232 | A * | 2/1975 | Weigt | B60J 1/02 |
| | | | | 343/701 |
| 3,928,748 | A * | 12/1975 | Sauer | B32B 17/10174 |
| | | | | 219/203 |
| 4,063,247 | A * | 12/1977 | Sakurai | H01Q 1/1278 |
| | | | | 219/203 |
| 4,971,848 | A * | 11/1990 | Ruelle | H05B 3/84 |
| | | | | 428/209 |
| 4,994,650 | A * | 2/1991 | Koontz | B32B 17/10174 |
| | | | | 219/505 |
| 5,792,298 | A * | 8/1998 | Sauer | B29C 63/0095 |
| | | | | 156/230 |
| 5,798,499 | A * | 8/1998 | Shibata | B32B 17/10036 |
| | | | | 52/171.2 |
| 5,804,719 | A * | 9/1998 | Didelot | B60S 1/0855 |
| | | | | 318/483 |
| 6,204,480 | B1 * | 3/2001 | Woodard | B32B 7/12 |
| | | | | 219/541 |
| 6,235,984 | B1 * | 5/2001 | Wambach | H01L 31/048 |
| | | | | 136/256 |
| 9,291,325 | B2 | 3/2016 | Verrat-Debailleul | |
| 10,118,369 | B2 | 11/2018 | Bureloux et al. | |
| 10,562,274 | B1 * | 2/2020 | Kingman | B32B 17/10165 |
| 11,148,399 | B2 | 10/2021 | Hennion | |
| 11,331,885 | B2 | 5/2022 | Hennion et al. | |
| 11,518,301 | B2 * | 12/2022 | Lojko | B60J 7/0015 |
| 2003/0116551 | A1 * | 6/2003 | Sol | B32B 17/10761 |
| | | | | 219/203 |
| 2004/0065651 | A1 * | 4/2004 | Voeltzel | B32B 17/10293 |
| | | | | 219/203 |
| 2005/0116510 | A1 * | 6/2005 | Leroy | B60R 9/055 |
| | | | | 296/216.01 |
| 2006/0086714 | A1 * | 4/2006 | Yamashita | H05B 3/84 |
| | | | | 219/448.19 |
| 2006/0099833 | A1 * | 5/2006 | Mann | B32B 17/10045 |
| | | | | 439/63 |
| 2006/0272227 | A1 * | 12/2006 | Doeppner | B32B 17/10036 |
| | | | | 52/171.3 |
| 2007/0184282 | A1 * | 8/2007 | Hauser | H05B 3/84 |
| | | | | 428/426 |
| 2008/0272623 | A1 * | 11/2008 | Kadzban | B60J 7/00 |
| | | | | 296/216.01 |
| 2010/0188246 | A1 * | 7/2010 | Getrost | C09K 11/7769 |
| | | | | 313/503 |
| 2011/0232748 | A1 * | 9/2011 | Shimizu | H02S 40/34 |
| | | | | 136/256 |
| 2012/0152930 | A1 * | 6/2012 | Chamberlain | H05B 3/86 |
| | | | | 219/203 |
| 2013/0092676 | A1 * | 4/2013 | Offermann | B32B 17/10036 |
| | | | | 219/203 |
| 2013/0140847 | A1 * | 6/2013 | Altes | H01Q 1/1214 |
| | | | | 296/210 |
| 2013/0153559 | A1 * | 6/2013 | Choi | H01R 43/00 |
| | | | | 219/541 |
| 2013/0277352 | A1 * | 10/2013 | Degen | H05B 1/0236 |
| | | | | 219/498 |
| 2015/0016132 | A1 | 1/2015 | Verrat-Debailleul | |
| 2015/0236491 | A1 * | 8/2015 | Bureloux | B32B 17/10293 |
| | | | | 174/650 |
| 2015/0283797 | A1 * | 10/2015 | Hennion | B32B 17/10889 |
| | | | | 156/101 |
| 2015/0334779 | A1 * | 11/2015 | Phan | B32B 17/10761 |
| | | | | 219/203 |
| 2016/0161081 | A1 | 6/2016 | Verrat-Debailleul | |
| 2016/0347028 | A1 * | 12/2016 | Kosaka | B60J 1/002 |
| 2017/0019955 | A1 * | 1/2017 | Schulz | H05B 3/86 |
| 2017/0118803 | A1 * | 4/2017 | Dimitrijevic | B32B 17/10036 |
| 2017/0369003 | A1 * | 12/2017 | Williams | B60R 11/04 |
| 2018/0090828 | A1 * | 3/2018 | Vendt | H01Q 9/28 |
| 2018/0170251 | A1 * | 6/2018 | Snider | B62D 65/02 |
| 2018/0342491 | A1 * | 11/2018 | Venk | B32B 17/10541 |
| 2019/0039353 | A1 | 2/2019 | Bureloux et al. | |
| 2019/0081392 | A1 * | 3/2019 | Vendt | H01Q 1/3275 |
| 2019/0157743 | A1 * | 5/2019 | Linow | H01Q 9/32 |
| 2019/0179459 | A1 * | 6/2019 | Weber | B32B 17/1022 |
| 2019/0202349 | A1 * | 7/2019 | Winton | B60R 11/0235 |
| 2019/0299566 | A1 * | 10/2019 | Berard | B32B 17/10036 |
| 2019/0299852 | A1 * | 10/2019 | Bauerle | B32B 17/10036 |
| 2019/0389181 | A1 * | 12/2019 | Hennion | B32B 17/10761 |
| 2020/0369007 | A1 * | 11/2020 | Bauerle | B32B 37/12 |
| 2020/0374987 | A1 * | 11/2020 | Yasuda | B32B 17/10761 |
| 2021/0001695 | A1 * | 1/2021 | Ogawa | H05B 3/86 |
| 2021/0053376 | A1 * | 2/2021 | Weissborn | B41M 3/006 |
| 2021/0101527 | A1 * | 4/2021 | Lojko | B60J 7/0015 |
| 2021/0282233 | A1 * | 9/2021 | Barlet | H05B 3/06 |
| 2022/0418112 | A1 * | 12/2022 | Bacharouche | C03C 17/36 |
| 2023/0138087 | A1 * | 5/2023 | Chamberlain | B32B 17/10036 |
| | | | | 428/428 |

FOREIGN PATENT DOCUMENTS

| | | | | |
|---|---|---|---|---|
| CN | 107139694 | A * | 9/2017 | |
| DE | 1196330 | B * | 7/1965 | |
| DE | 3644297 | A1 * | 7/1987 | ....... B32B 17/10174 |
| DE | 3716766 | A1 * | 11/1987 | ....... B32B 17/10036 |
| DE | 19823124 | A1 * | 11/1999 | ....... B32B 17/10293 |
| DE | 19941251 | A1 * | 3/2001 | ........... H01R 13/631 |
| DE | 10052529 | A1 * | 5/2002 | ........ H01L 31/02013 |
| DE | 10241728 | A1 * | 3/2004 | ....... B32B 17/10036 |
| DE | 10259110 | B3 * | 7/2004 | ............... H05B 3/84 |
| DE | 10310671 | A1 * | 10/2004 | ............ B60J 7/1642 |
| DE | 10335979 | A1 * | 12/2004 | ....... B32B 17/10036 |
| DE | 102004039883 | B3 * | 6/2006 | ....... B32B 17/10036 |

(56) References Cited

FOREIGN PATENT DOCUMENTS

| | | | | |
|---|---|---|---|---|
| DE | 202007012124 U1 * | 1/2008 | ....... | B32B 17/10018 |
| DE | 202007012125 U1 * | 1/2008 | ............. | B29C 39/10 |
| EP | 7857 A * | 2/1980 | ....... | B32B 17/10018 |
| EP | 393437 A1 * | 10/1990 | ......... | B60H 1/00428 |
| EP | 656257 A1 * | 6/1995 | ....... | B32B 17/10376 |
| EP | 835743 A2 * | 4/1998 | ............ | B29C 70/763 |
| EP | 1437215 A1 * | 7/2004 | ....... | B32B 17/10018 |
| EP | 1672960 A1 * | 6/2006 | ....... | B32B 17/10036 |
| EP | 1834760 A1 * | 9/2007 | ....... | B32B 17/10036 |
| EP | 1908584 A1 * | 4/2008 | ............. | B32B 15/08 |
| EP | 3406961 A1 * | 11/2018 | ............. | H01L 25/13 |
| EP | 3702217 A1 * | 9/2020 | ............... | B32B 1/00 |
| FR | 2811778 A1 * | 1/2002 | ....... | B32B 17/10036 |
| JP | 0308020 U * | 1/1991 | | |
| JP | 11339942 A * | 12/1999 | ....... | B32B 17/10036 |
| JP | 2009017236 A * | 1/2009 | | |
| JP | 2010186566 A * | 8/2010 | | |
| KR | 2003041260 A * | 5/2003 | ............. | B60S 1/026 |
| WO | WO-03051088 A2 * | 6/2003 | ....... | B32B 17/10036 |
| WO | WO-03071964 A2 * | 9/2003 | ....... | B32B 17/10018 |
| WO | WO-2007062638 A1 * | 6/2007 | ......... | B60R 13/0225 |
| WO | WO-2007085599 A1 * | 8/2007 | ....... | B32B 17/10018 |
| WO | WO-2008121760 A1 * | 10/2008 | ......... | B60R 11/0235 |
| WO | WO-2009001264 A1 * | 12/2008 | ....... | B32B 17/10036 |
| WO | WO-2012031908 A1 * | 3/2012 | ....... | B32B 17/10036 |
| WO | 2013110885 A1 | 8/2013 | | |
| WO | 2014057224 A1 | 4/2014 | | |
| WO | WO-2014131972 A1 * | 9/2014 | ....... | B32B 17/10293 |
| WO | WO-2017063895 A1 * | 4/2017 | ............. | B32B 17/10 |
| WO | WO-2018055390 A1 * | 3/2018 | ....... | B32B 17/10036 |
| WO | WO-2018142078 A1 * | 8/2018 | ........... | B32B 17/061 |
| WO | 2018178591 A1 | 10/2018 | | |
| WO | WO-2019008493 A1 * | 1/2019 | ....... | B32B 17/10018 |
| WO | WO-2019105855 A1 * | 6/2019 | ......... | B23K 26/0624 |
| WO | WO-2019107458 A1 * | 6/2019 | ................ | B60J 1/00 |
| WO | WO-2020039781 A1 * | 2/2020 | ........... | B32B 17/061 |
| WO | WO-2022023638 A1 * | 2/2022 | | |
| WO | WO-2022194646 A1 * | 9/2022 | ............... | B32B 1/00 |

OTHER PUBLICATIONS

Machine Translation of WO-2007085599-A1, Aug. 2007 (Year: 2007).*
Machine Translation of BE-1019812-A3, Jan. 2013 (Year: 2013).*
Machine Translation of WO-2014131972-A1, Sep. 2014 (Year: 2014).*
Office Action in corresponding European patent application No. 21156668.2 dated Oct. 6, 2023.
European Search Report for corresponding European patent application No. 21156668.2 dated Jul. 20, 2021.

* cited by examiner

TRANSPARENT ROOF PANEL HAVING AN ISOLATED CENTER UNIT

BACKGROUND

The discussion below is merely provided for general background information and is not intended to be used as an aid in determining the scope of the claimed subject matter.

Aspects of the invention relates to a transparent roof panel for use in a vehicle.

A transparent roof panel in a vehicle roof is well known. For example, an open-roof assembly comprising a glass panel is known. The open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastics. The closure member may be configured to tilt or to slide.

Another well-known embodiment comprises a fixed transparent panel arranged in the vehicle roof. Such fixed transparent panels may be preferred for allowing a large transparent area.

On the other hand, a number of functions are known to be provided in or on the vehicle roof. For example, passenger compartment lighting is commonly available in a central area of the passenger compartment. Further, it is known to provide a multimedia system or one or more sensors, for example. In order to preserve transparency, it is known to omit such functions or to position such functions elsewhere, if a transparent roof panel is applied.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects disclosed provide a transparent panel for a vehicle roof comprising an electric apparatus in a central area thereof, while preserving transparency around the electric apparatus.

In a first aspect, a transparent panel is configured for use in a vehicle roof of a vehicle and comprises a layered stack and an electric apparatus mounted thereon. The layered stack comprises a first transparent pane comprising a first main surface and a second main surface, the second main surface being opposite the first main surface; a second transparent pane comprising a third main surface, facing the second main surface, and a fourth main surface, the fourth main surface being opposite the third main surface, wherein the second transparent pane comprises a through hole extending between the third and the fourth main surface; and an electrically conductive assembly arranged between the second and the third main surface. The electric apparatus is mounted on the fourth surface, covers the through hole and is electrically coupled to the electrically conductive assembly through the through hole.

The electrically conductive assembly comprises a first terminal arranged in a first area of the layered stack, the first area being adjacent to a circumferential edge of the through hole; a second terminal arranged in a second area of the layered stack, the second area being adjacent to a circumferential edge of the transparent panel; and a visually-transparent conductive layer electrically coupling the first and the second terminal and being arranged in an intermediate area of the layered stack, the intermediate area being adjacent to the first and the second area. The first area has a first optical transmissivity and the intermediate area has a second optical transmissivity, wherein the second optical transmissivity is lower than the first optical transmissivity. Further, the electric apparatus covers the first area.

The transparent panel comprises a layered stack such as a laminated glass panel or a stack of plastic panes or a combination thereof. Between two panes, the electrically conductive assembly is provided for supplying electricity to the electric apparatus that is arranged in a central part of the transparent panel.

The electrically conductive assembly comprises a first and a second terminal for supplying and receiving the electricity, respectively. The second terminal is arranged at or near a circumferential edge of the transparent panel such that an external voltage supply may be electrically coupled to the second terminal. The first terminal is arranged at or near a circumferential edge of the through hole such that the electric apparatus may be electrically coupled to the first terminal for receiving the voltage of the voltage supply. The visually-transparent conductive layer is electrically connected between the first and the second terminal and provides an electrically conductive path between the first and the second terminal.

In order to preserve transparency, the visually-transparent conductive layer appears transparent to a human eye (human vision system, HVS) under normal or intended use conditions. As used herein, such normal or intended use conditions mean that an occupant of the vehicle, not paying particular attention to the construction of the transparent panel, does not see or notice or at least is not disturbed by any object or element in the transparent part of the transparent panel. So, to an occupant of the vehicle, it seems that the transparent roof panel provides an undisturbed view to the surroundings.

The first area, in which the first terminal is arranged, is covered by the electric apparatus that is mounted on the fourth main surface. Therefore, the transmissivity, i.e. the transparency, of the first area may be low or the first area may even be opaque as a view through the transparent panel is already blocked by the electric apparatus. Optionally, an opaque layer, e.g. a black ceramics layer or the like, may be intentionally applied in the first area to provide for a smooth finish and look through the first transparent pane.

The transmissivity or transparency of the intermediate area, on the other hand, is higher, preferably as high as possible, more preferably to the extent desired by vehicle passengers. Usually, the transmissivity of a transparent roof panel is reduced to prevent blinding by sunlight, for example, while haze and other optical disturbances are kept as low as possible. Thus, an optical transmissivity of the transparent panel is not visually deteriorated in an area of the electrically conductive assembly around the electric apparatus.

It is noted that the electric apparatus may be arranged on an interior side of the transparent panel, i.e. in a passenger compartment of the vehicle or the electric apparatus may be arranged on an exterior side of the transparent panel, i.e. on the roof of the vehicle.

In an embodiment the first terminal has a first conductance per unit area and the visually-transparent conductive layer has a second conductance per unit area, the first conductance per unit area being higher than the second conductance per unit area. The electric apparatus needs to be supplied with sufficient electric current for operation. Depending on the functions embodied in the electric apparatus, a certain amount of electric current is needed for functional operation. Thus, a high current may need to be supplied through the electrically conductive assembly. As the transmissivity of the first terminal, and usually also the transmissivity of the second terminal may be low, any suitable highly conductive material may be applied, e.g. a copper or gold layer may be applied. The visually-transparent conductive layer, however, may have a lower conductivity due to the transparency requirement. Such limited conductivity in combination with a relatively high electric current leads to heat being generated in the visually-transparent conductive layer. The transparent roof panel may be designed and configured to withstand an increased heat, but due to associated expansion of the transparent roof panel, the heat generation may still need to be kept low in view of the fact that the transparent panel is mounted in or on a vehicle body, that may not be equally heated or at least may not equally expand.

Further, a heat gradient in the transparent panel is preferably kept low in general and in particular taking into account the presence of the through hole in the second transparent pane. Therefore, a diameter of the through hole is preferably kept as small as possible in order to reduce the chance of cracking, or the like, due to the weakening of and stress in the second transparent pane. By providing the electric apparatus on the fourth surface and not in a recess or through hole in the layered stack, it is enabled to provide a through hole with a small diameter through which only an electrical connection needs to be made possible.

For the above reason, it may be preferred to select a surface area of the first terminal to be large or to have a boundary between the first area and the intermediate area to be as far removed from the through hole as possible. As the conductivity of the first terminal may be selected and designed to be high, very little heat will be generated in the first terminal. Keeping heat away from the through hole may prevent unnecessary stress in the second transparent pane near the through hole.

In an embodiment, the visually-transparent conductive layer of the electrically conductive assembly comprises a transparent electrically conductive composition. As known in the art, there are compositions that are transparent, or at least have a high transmissivity, and are electrically conductive, albeit that such electrical conductivity may be lower than well-known electric conductive materials like copper and gold. Using a transparent electrically conductive composition as a layer in the electrically conductive assembly may thus be suitable, depending on the amount of current used by the electric apparatus and an amount of heat that may be safely generated.

In a particular embodiment thereof, the first terminal comprises a first boundary at a circumferential edge of the through hole and a second boundary with the visually-transparent conductive layer, wherein a length of the second boundary is larger than a length of the first boundary. With a small diameter of the through hole, only a small width of the layer of transparent electrically conductive composition would remain near the through hole. Consequently, a current density near the through hole could become high, which could result in an increased heat generation. In this embodiment, the highly conductive first terminal may be designed to have a longer boundary with the layer of transparent electrically conductive composition, thereby reducing the current density and thus local heat generation.

In an embodiment, the visually-transparent conductive layer of the electrically conductive assembly comprises two or more electrically conductive leads, the two or more leads extending between the first terminal and the second terminal, wherein a cross-section of the leads has a width that is smaller than about 100 micrometres, the width of the leads extending in parallel to the second main surface. Providing multiple leads between the first and the second terminal results in the current dividing over the multiple leads and thus reducing the current per lead. With such reduced current, a cross-sectional size of the lead may be reduced. In particular, in order to achieve the visual transparency, at least the width of the leads is kept small. The width is at least smaller than about 100 micrometres and is preferably even smaller. For example, the width may be smaller than about 70 micrometres or even smaller than about 50 micrometres. The smaller the cross-sectional size of the leads, the better the experienced transparency. On the other hand, the smaller the cross-sectional size, the more lead may be needed to provide for sufficient conductivity between the first and the second terminal to enable a sufficiently large current without generating too much heat.

In a particular embodiment, a first lead is shorter than a second lead and an electrical resistance of the first lead is higher than an electrical resistance of the second lead. In order to limit a temperature gradient, it may be desired to prevent that some leads generate more heat locally, i.e. heat per unit length of the lead, than others. Considering electric power consumption, Ohm's law and Pouillet's law, it follows that a longer lead may be preferred to have a larger cross-sectional area to reduce the resistance of the lead, even to the extent that the longer lead has a lower resistance than a shorter lead. Theoretically, for an equal heat generation per unit length, the cross-sectional area of a lead is proportional to the length squared:

$$\left(\frac{l_1^2}{l_2^2}\right) = \frac{A_1}{A_2} \qquad \text{(Eq. 1)}$$

wherein $l_1$ is the length of a first lead, $l_2$ is the length of a second lead, $A_1$ is a cross-sectional area of the first lead and $A_2$ is a cross-sectional area of the second lead. Of course, in this theoretical consideration, it is assumed that the leads are composed of the same material. Use of different materials having different resistivity would result in a different equation and thus dimensions. Further, considering the transparency, it may not be needed to increase the cross-sectional area with the length corresponding to Eq. 1 as some predetermined temperature gradient may be acceptable. Even further, taking into account one or more other aspects like positioning of the leads, the spacing between the leads and heat conductivity in the transparent panel, a different theoretically preferred relation may be identified.

In an embodiment, the electrically conductive assembly comprises a third terminal arranged in a third area of the layered stack and a fourth terminal arranged in a fourth area of the layered stack; and the visually-transparent conductive layer comprises a first conductive layer section and a second conductive layer section, the first and the second conductive layer sections being electrically isolated from each other. The first conductive layer section electrically couples the first and the second terminal and is arranged in a first intermediate subarea and the second conductive layer section electrically couples the third and the fourth terminal and is arranged in a second intermediate subarea. Thus, an anode connection and a cathode connection may be provided.

In a particular embodiment, the second transparent pane comprises a first and a second through hole, wherein the first terminal is arranged adjacent to the first through hole and wherein the third terminal is arranged adjacent to the second through hole. For electrically coupling the anode and the cathode to the electric apparatus, a single through hole may be used or two through holes may be provided. Selecting one or more through holes may depend on a number of aspects. For example, strength of and stress in the transparent panel may be considered or electrical properties like conductivity and capacitance may be taken into account. Further, manufacturability may be considered, for example.

In an embodiment, the layered stack further comprises an intermediate layer between the second main surface and the third main surface for adhering the first transparent pane and the second transparent pane and the first terminal and the second terminal are arranged on the second main surface. Further, in this embodiment, the electrically conductive assembly comprises a third terminal and a fourth terminal and both terminals are arranged on the third main surface. The visually-transparent conductive layer comprises a first conductive sublayer arranged on the second main surface and a second conductive sublayer arranged in the third main surface, the first and the second conductive sublayers being electrically isolated from each other by the intermediate layer. The first conductive sublayer electrically couples the first and the second terminal and the second conductive sublayer electrically couples the third and the fourth terminal. Hence, in this embodiment, an anode connection and a cathode connection are arranged on different main surfaces in the layered stack, wherein an intermediate layer keeps the anode and cathode separated. Of course, in this embodiment, the dielectric properties of the intermediate layer need to be selected suitable, as apparent to those skilled in the art.

In a particular embodiment, the second transparent pane comprises a first and a second through hole, wherein the first terminal is arranged adjacent to the first through hole and wherein the third terminal is arranged adjacent to the second through hole. In this particular embodiment, the third terminal is arranged adjacent to the relevant through hole on an opposing main surface. It may be preferred to have the third terminal directly opposite to such through hole or it may be preferred to have it slightly shifted. If possible and appropriate, the third terminal may be designed to cover a large surface area compared to a cross-sectional area of the through hole, thereby being arranged both directly opposite the through hole and extending further away, enabling any suitable kind of electrical connection.

It is noted that in the above-described embodiment having the anode and cathode connections in separate subareas, such anode and cathode connections may be arranged on the second main surface or third main surface. Moreover, also in such embodiment, the anode and cathode connections may be arranged on different main surfaces.

In an embodiment, the transparent panel has a panel width, the panel width extending perpendicular to a main driving direction of the vehicle, wherein the electric apparatus is arranged in a center of the panel width and wherein at least a part of the panel in the panel width direction adjacent to the electric apparatus is uncovered by the electric apparatus.

In an embodiment, at least one of the first transparent pane and the second transparent pane is tinted. In particular in combination with a number of leads provided in the visually-transparent conductive layer, at least one tinted transparent pane reduces contrast and thereby reduces visibility of such leads. In general, as described hereinabove, a tinted panel is common and may be preferred for preventing blinding, for example.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

DETAILED DESCRIPTION OF THE ILLUSTRATIVE EMBODIMENTS

Figure 1A:
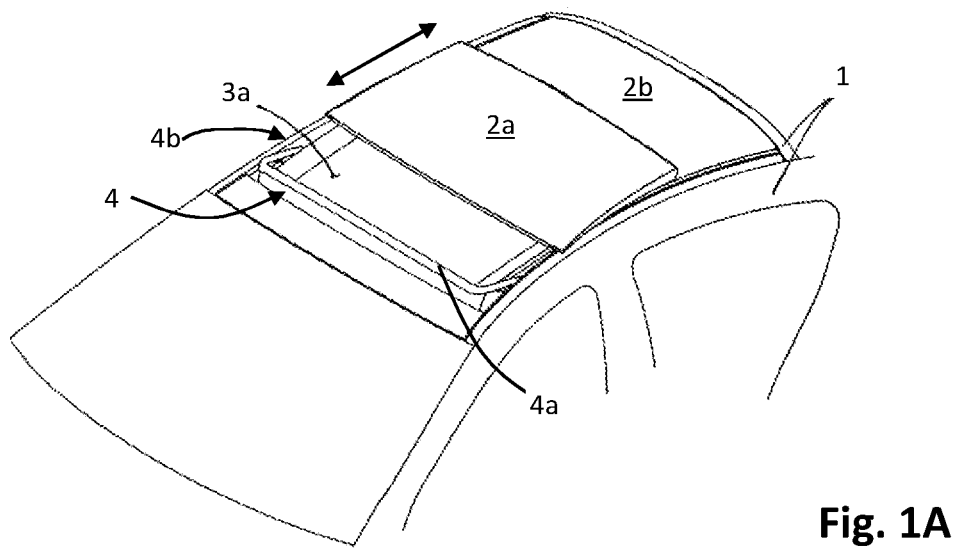
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2*a* may be in a tilted position, which is a position wherein a rear end RE of the moveable panel 2*a* is raised as compared to the closed position, while a front end FE of the moveable panel 2*a* is still in the closed position. Further, the moveable panel 2*a* may be in an open position, which is a position wherein the moveable panel 2*a* is slid open and the first roof opening 3*a* is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
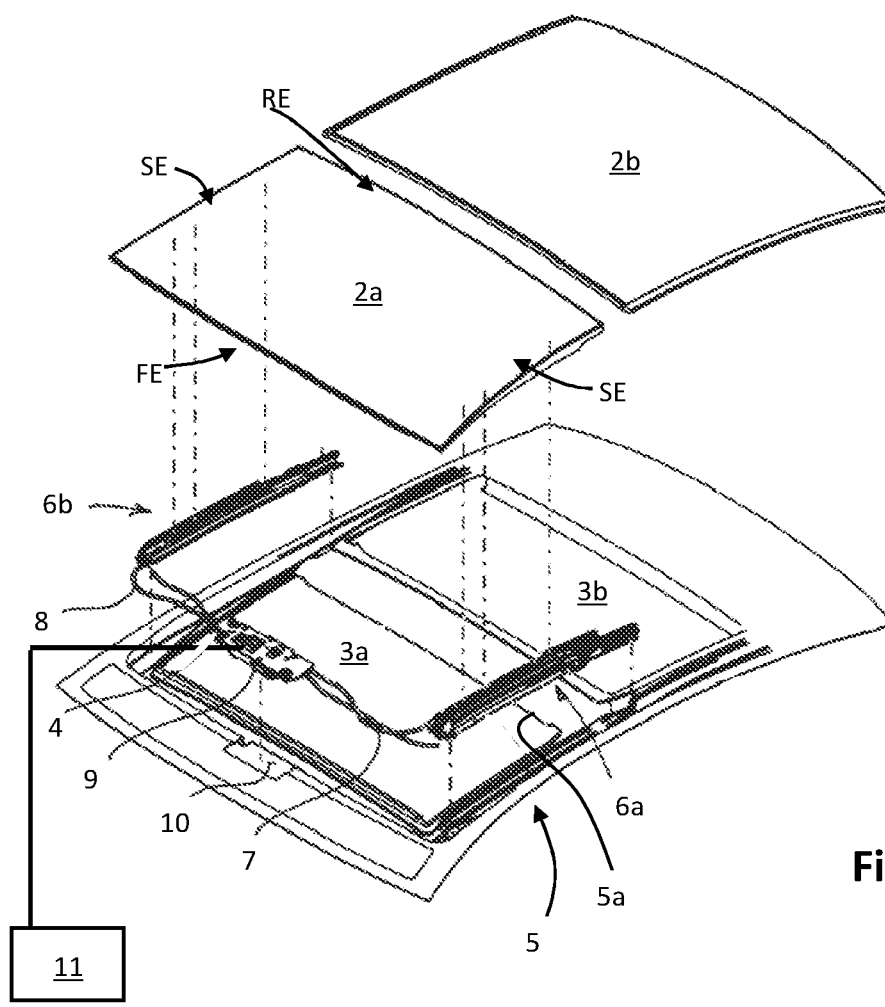
FIG. 1B shows an exploded view of the open roof assembly of FIG. 1A.

FIG. 1B illustrates the same vehicle roof as shown in FIG. 1A having panels 2*a* and 2*b*. In particular, while FIG. 1A shows the open roof assembly in the open position, FIG. 1B is an exploded view of the open roof assembly in a closed position. Further, in this exploded view of FIG. 1B, it is shown that there is a second roof opening 3*b*. The first and second roof openings 3*a*, 3*b* are provided in a frame 5 of the open roof assembly. An edge 5*a* of the frame 5 defines the first roof opening 3*a*.

The second roof opening 3*b* is arranged under the fixed panel 2*b* such that light may enter a vehicle interior passenger compartment through the fixed panel 2*b*, presuming that the fixed panel 2*b* is a glass panel or a similarly transparent panel, for example made of a plastic material or any other suitable material. The second roof opening 3*b* with a transparent or translucent fixed panel 2*b* is optional and may be omitted in another embodiment of the open roof assembly.

The wind deflector 4 is commonly a flexible material, e.g. a woven or non-woven cloth having through holes arranged therein or a web or net. The flexible material is supported by a support structure 4*a*, e.g. a bar-like or tube-like structure, which structure is hingedly coupled, directly or indirectly, to the frame 5 at a hinge 4*b*.

The wind deflector 4 is arranged in front of the first roof opening 3*a* and adapts air flow when the moveable panel 2*a* is in the open position. In its raised position, the wind deflector 4 reduces inconvenient noise due to air flow during driving. When the moveable panel 2*a* is in the closed position or in the tilted position, the wind deflector 4 is held down below the front end FE of the moveable panel 2*a*.

Usually, the wind deflector 4 is raised by a spring force when the moveable panel 2*a* slides to an open position and the wind deflector 4 is pushed down by the moveable panel 2*a* when the moveable panel 2*a* slides back into its closed position. In FIG. 1A, the moveable panel 2*a* is shown in an open position and the wind deflector 4 is shown in a raised position. In FIG. 1B, the moveable panel 2*a* is shown in a closed position and the wind deflector 4 is correspondingly shown in a position in which it is held down.

FIG. 1B further illustrates a drive assembly having a first guide assembly 6*a*, a second guide assembly 6*b*, a first drive cable 7 and a second drive cable 8. The first and second guide assemblies 6*a*, 6*b* are arranged on respective side ends SE of the moveable panel 2*a* and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6*a*, 6*b* and a electric motor 9.

The drive cables 7, 8 couple the electric motor 9 to the mechanisms of the respective guide assemblies 6*a*, 6*b* such that upon operating the electric motor 9, the mechanisms start to move. In particular, a core of the drive cable 7, 8 is moved by the electric motor 9 such to push or pull on the mechanisms of the respective guides 6*a*, 6*b*. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6*a*, 6*b* and, in such embodiment, a drive assembly may be omitted completely.

In the illustrated embodiment, the guide assemblies 6*a*, 6*b* may start movement with raising the rear end RE of the moveable panel 2*a*, thereby bringing the moveable panel 2*a* in the tilted position. Then, from the tilted position, the guide assemblies 6*a*, 6*b* may start to slide to bring the moveable panel 2*a* in the open position. The present invention is however not limited to such embodiment. For example, in another embodiment, the moveable panel 2*a* may be moveable to a tilted position by raising the rear end RE, while an open position is reached by first lowering the rear end RE and then sliding the moveable panel 2*a* under the fixed panel 2*b* or any other structure or element provided behind the rear end RE of the moveable panel 2*a*. In further exemplary embodiments, the moveable panel 2*a* may be merely moveable between a closed position and a tilted position or between a closed position and an open position.

In the illustrated embodiment, the electric motor 9 is mounted near or below the front end FE of the moveable panel 2*a* at a recess 10. In another embodiment, the electric motor 9 may be positioned at any other suitable position or location. For example, the electric motor 9 may be arranged near or below the rear end RE of the moveable panel 2*a* or below the fixed panel 2*b*.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
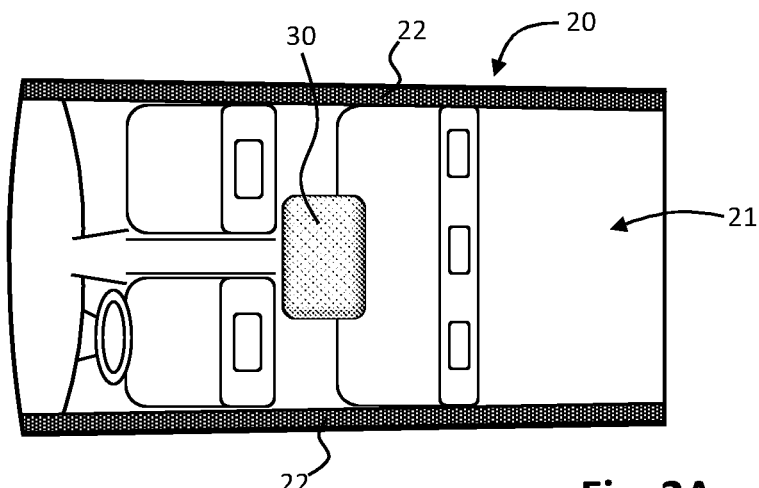
FIG. 2A shows a top view of a first embodiment of a transparent panel in a roof of a vehicle.

FIG. 2A shows a top view of a transparent roof panel 20 arranged in a roof of a vehicle. The transparent panel 20 comprises a transparent intermediate area 21 and opaque second areas 22, wherein the opaque areas 22 may comprise a black ceramic composition, such as an enamel layer, or a black rubber-like composition, also well-known as encapsulation. In a first area arranged in a central part of the transparent panel 20, an electric apparatus 30 is mounted on a passenger compartment side of the transparent panel 20. An opaque layer may be provided on or in the transparent panel 20 to hide a backside of the electric apparatus 30 from view from the outside.

Figure 2B:
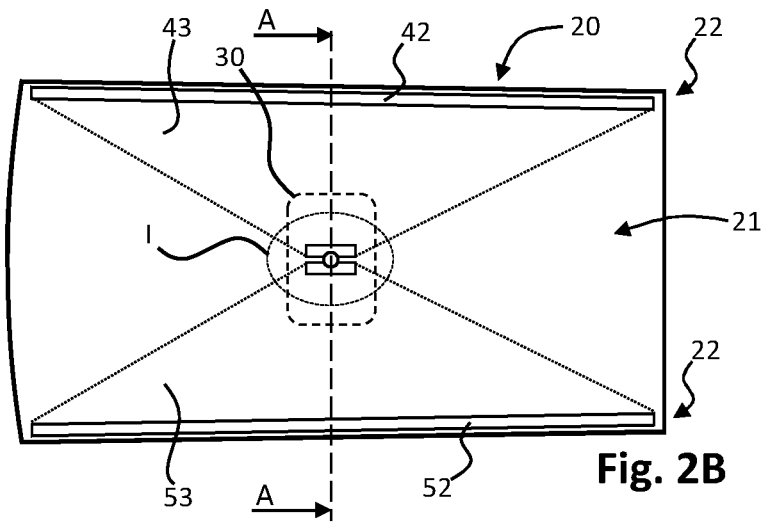
FIG. 2B shows another top view of the first embodiment of the transparent panel.
Figure 2C:
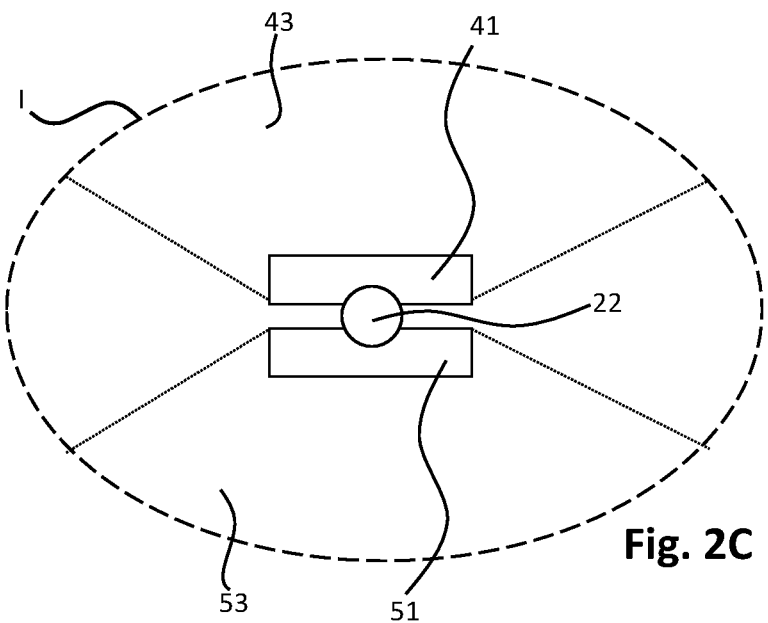
FIG. 2C shows an enlarged part of the top view of FIG. 2B.

In FIG. 2B, the transparent panel 20 is shown in more detail; FIG. 2C shows the central part I of the transparent panel 20 enlarged; and FIG. 2D shows a cross-section of the transparent panel 20 along line A-A.

Figure 2D:
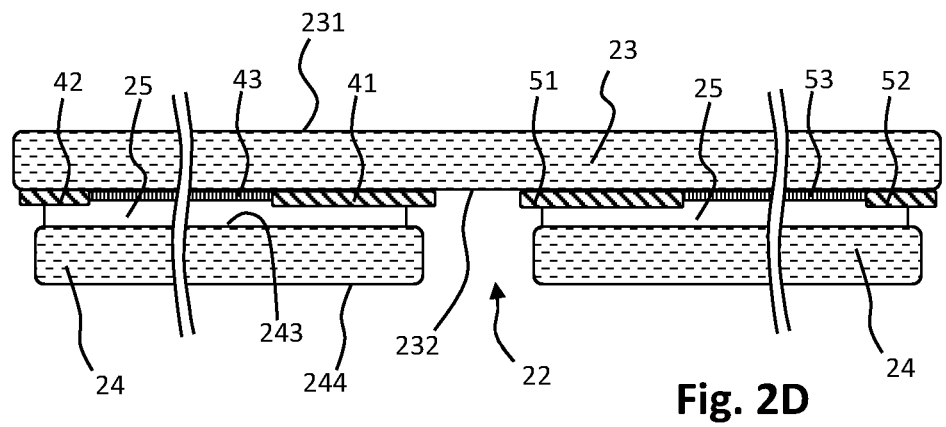
FIG. 2D shows a cross-section of the first embodiment of FIGS. 2A and 2B.

Referring to FIGS. 2B-2D, the transparent panel 20 comprises a first terminal 41 arranged in the first area, a second terminal 42 arranged in the second area 22 and a first subarea 43 of a visually-transparent conductive layer arranged in the intermediate area 21. Further, the transparent panel 20 comprises a third terminal 51, a fourth terminal 52 and a second subarea 53 of the visually-transparent conductive layer. The first and second subareas 43, 53 electrically connect the first and second terminals 41, 42 and the third and fourth terminals 51, 52, respectively.

As illustrated in FIG. 2D, the terminals 41, 42, 51, 52 and the visually-transparent conductive layer are arranged between a first transparent pane 23 and a second transparent pane 24. The first transparent pane comprises a first main surface 231 and a second main surface 232. The second transparent pane 24 comprises a third main surface 243 and a fourth main surface 244.

A through hole 22 is provided in the second transparent pane 24 and extends between the third main surface 243 and the fourth main surface 244. An intermediate layer 25 such as an EVA or PVB layer adheres the first and second transparent panes 23, 24 to each other.

In this first embodiment, the second and fourth terminals 42, 52 extend along a side edge of the transparent panel 20 and the first and third terminals 41, 51 are arranged in the first area in the central part of the transparent panel 20 adjacent to the through hole 22. Further, all terminals 41, 42, 51, 52 and the visually-transparent conductive layer are arranged on the second main surface 232.

The terminals 41, 42, 51, 52 may comprise an electrically conducting material, preferably a conductive material having a low resistivity, e.g. a metal such as copper, gold, silver, or the like. The terminals 41, 42, 51, 52 may be applied by plating or as a band adhered to the first transparent pane 23 by use of an adhesive or an adhesive tape. Any other suitable method of application may be used as well.

The visually-transparent conductive layer comprises, in this first embodiment, a coating of an electrically conductive transparent composition. Such a composition may comprise an metal-oxide, like indium-tin-oxide (ITO) or the like. Such conductive and transparent coatings are known in the art. The conductivity of such a thin layer of electrically conductive transparent composition may however be limited as compared to a plated or adhered metallic layer. Therefore, a surface area covered with the electrically conductive transparent composition may be selected to be large in order to increase the conductivity as much as possible.

The electric apparatus 30 (not shown in FIG. 2D) is mounted on the fourth main surface 244 and is electrically connected to the first and third terminal 41, 51 for receiving a supply voltage, which is applied to the second and fourth terminal 42, 52 and is conducted to the first and third terminal 41, 51 through the layer of the electrically conductive transparent composition in the first and second subareas 43, 53 in the intermediate area 21. Electrically conductive leads may be electrically connected to the first and third terminal 41, 51 and extend through the through hole 22 to the electric apparatus 30.

Figure 2E:
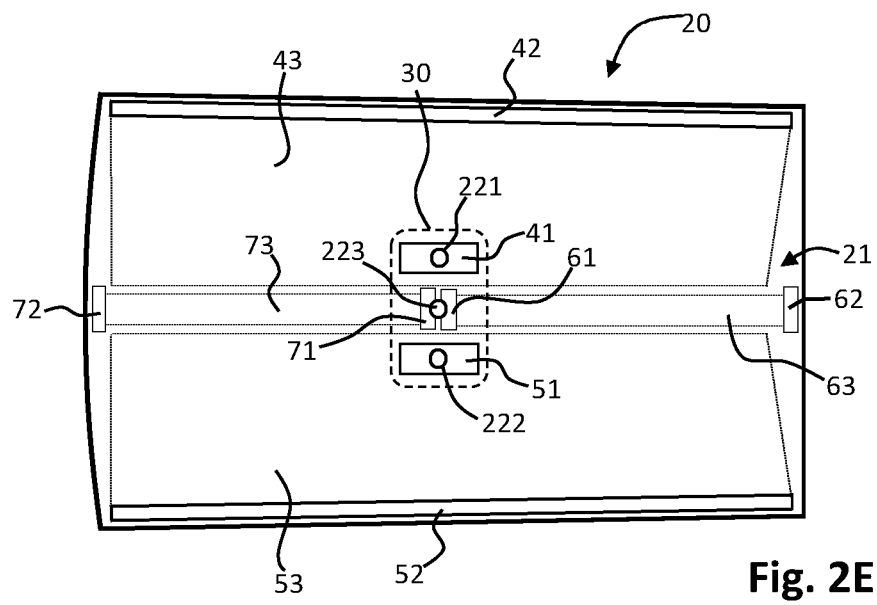
FIG. 2E shows a top view of a second embodiment of a transparent panel for use in a vehicle roof.

FIG. 2E shows a second embodiment, wherein three through holes 221, 222, 223 are provided in the second transparent pane. The first terminal 41 is arranged around a peripheral edge of the first through hole 221 and the third terminal 51 is arranged around a peripheral edge of the second through hole 222. A fifth terminal 61 and a seventh terminal 71 are arranged adjacent to a peripheral edge of the third through hole 223. The fifth terminal 61 is electrically coupled to a sixth terminal 62 via a third visually transparent and electrically conductive subarea 63. The seventh terminal 71 is electrically coupled to an eighth terminal 72 via a fourth visually transparent and electrically conductive subarea 73.

The first terminal 41 and the third terminal 51 are configured to provide a supply voltage and a corresponding supply current. Such supply current may be relatively large. Therefore, a large surface area of the second or third main surface 232, 243 are covered with the electrically conductive transparent composition to provide a relatively large conductivity, as above described. Moreover, a length of a boundary between the subareas 43, 53 of electrically conductive transparent composition and the respective first and third terminals 41, 51 is made relatively large by arranging the subareas 43, 53 all around the respective terminals 41, 51 in order to further improve conductivity to said terminals.

The fifth and seventh terminals 61, 71 are provided for input or output of an electrical signal. Such a signal may be a control signal for controlling operation of the electric apparatus or it may be a sensor signal generated by a sensor in the electric apparatus and used by another device arranged in another part of the vehicle. Usually, such a signal does not require a large current and therefore, a smaller subarea 63, 73 is provided for the layer of the electrically conductive transparent composition connecting the fifth and the seventh terminal 61, 71 to the sixth and the eighth terminal 62, 72, respectively.

As apparent from FIGS. 2B and 2E, a local shortest distance between the first terminal 41 and the second terminal 42 varies. Consequently, a local conductivity and thus local heat generation may vary as well. In order to reduce local temperature differences, which could lead to undesired stress and tension in the transparent panel 20, the subarea 43 of the layer of electrically conductive transparent composition may be divided in two or more parts and the second terminal 42 may be divided in a corresponding number of parts such that a local current density in the layer of the electrically conductive transparent composition may be controlled. As apparent to those skilled in the art, other conductive layers may be divided similarly.

A connection to the electric apparatus 30 may be embodied in any other technically suitable manner as well. For example, a wireless connection through radio communication (e.g. WiFi, Bluetooth) or through optical communication (e.g. LiFi) may be used. Additionally or alternatively, an optical connection using one of the transparent panes 23, 24 as an optical guide may be used or an optical connection through a fibre optic cable arranged between the first and the second transparent panes 23, 24 may be used.

Figure 3A:
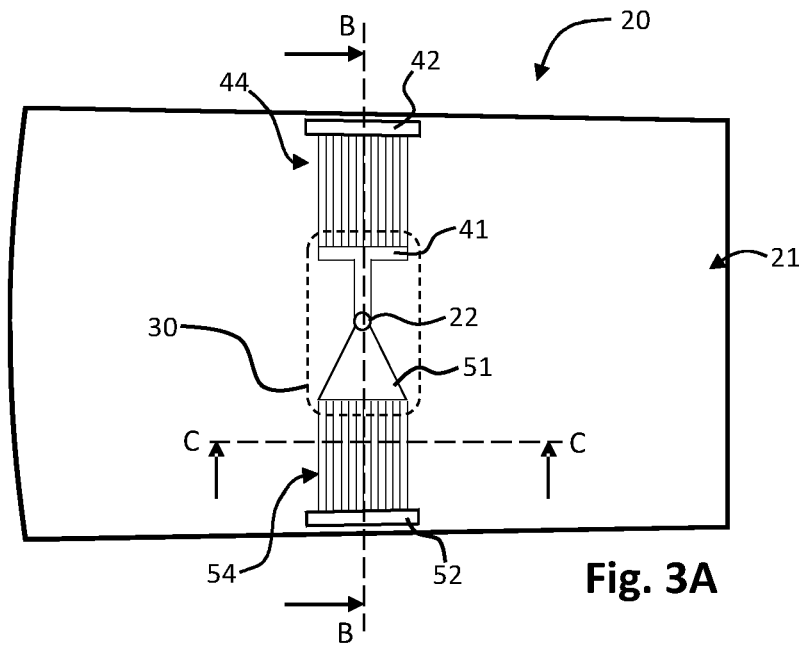
FIG. 3A shows a top view of a third embodiment of a transparent panel for use in a vehicle roof.
Figure 3B:
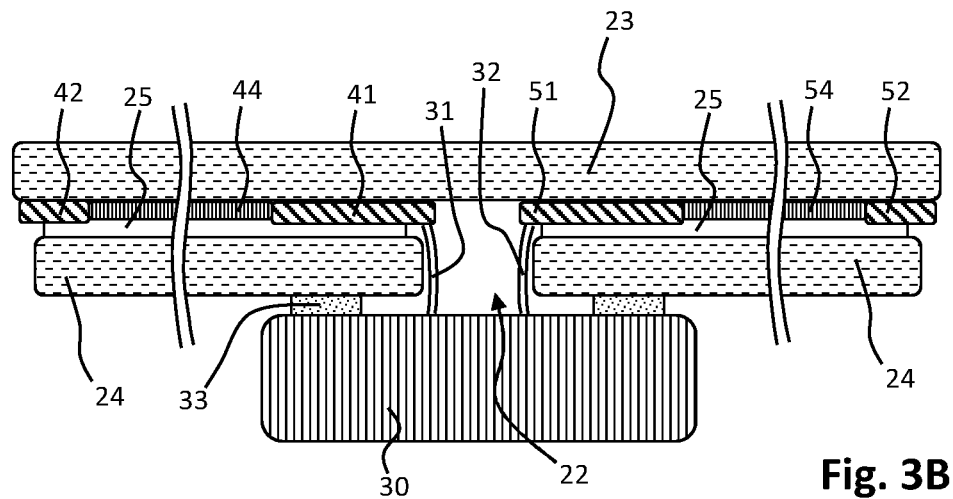
FIG. 3B shows a first cross-section of the third embodiment of FIG. 3A.
Figure 3C:
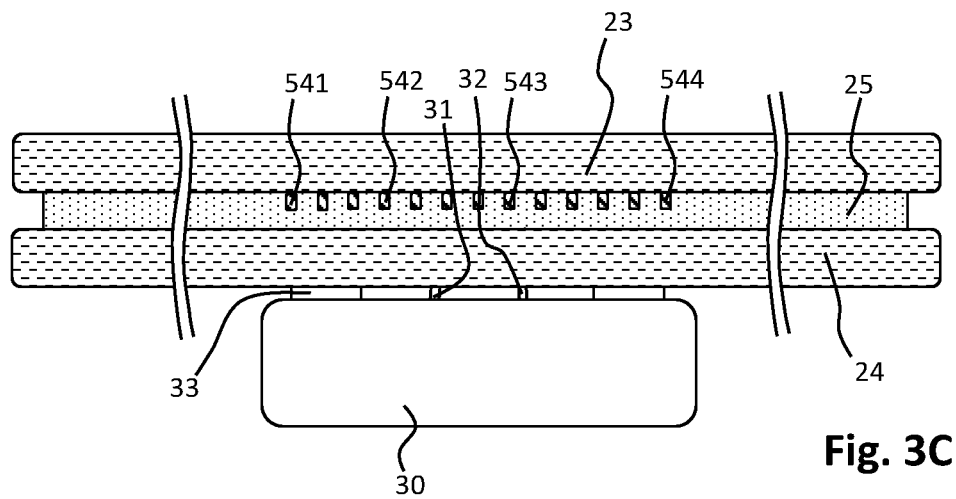
FIG. 3C shows a second cross-section of the third embodiment of FIG. 3A.

FIGS. 3A-3C illustrate a third embodiment of the transparent panel 20. FIG. 3B shows a cross-section along line B-B. FIG. 3C shows a cross-section along line C-C.

Compared to the above first and the second embodiments, in third embodiment, the electrically conductive transparent composition is omitted and, instead, a first set of thin conductive leads 44 are provided between the first and the second terminal 41, 42 and a second set of thin conductive leads 54, including leads 541, 542, 543 and 544, are provided between the third and fourth terminal 51, 52. The first and second sets of leads 44, 54 are configured and designed to be unnoticeable under normal viewing conditions. Thereto, the leads are selected to be thin, i.e. to have a small cross-sectional area and in particular a small width (dimension of the leads parallel to line C-C), such to have a low visibility. Further, a spacing between the leads is selected to be relatively large to further reduce visibility. On the other hand, the cross-sectional area is selected to be as large as possible and a number of leads is selected to be as high as possible to improve conductivity. Hence, a balance between visibility and conductivity is sought.

The width of each lead is preferably smaller than 100 micrometres to prevent visibility and is preferably even smaller. For example, the width may be smaller than 70 micrometres or even smaller than 50 micrometres. In order to enable a sufficiently large electrical current, a number of leads may be increased with decreasing cross-sectional area of each lead. For example, with a length of about 80 cm, a safe current of 3 A may be achieved with a cross-sectional area of about 0.14 mm². Assuming a square cross-sectional shape of each lead, table 1 shows a number of leads needed to jointly provide such a cross-sectional area.

TABLE 1

| Lead width [μm] | 20 | 30 | 40 | 50 | 60 | 70 |
|---|---|---|---|---|---|---|
| Cross-sectional area per lead [mm²] | $4 \cdot 10^{-4}$ | $9 \cdot 10^{-4}$ | $1.6 \cdot 10^{-3}$ | $2.5 \cdot 10^{-3}$ | $3.6 \cdot 10^{-3}$ | $4.9 \cdot 10^{-3}$ |
| Number of leads | 350 | 156 | 88 | 56 | 39 | 29 |

Conductivity may be further improved by keeping the leads 44, 54 short. So, for example, the first and third terminal 41, 51 may be arranged to have an edge near an edge of the electric apparatus (outline indicated by dashed line 30). In this illustrated third embodiment, the first terminal 41 is shown in a T-shape, while the third terminal 51 is shown in a triangular shape. In practice, any shape may be selected, wherein the leads 44, 54 may be kept short and an electrical connection to the electric apparatus 30 may be made through the through hole 22 e.g. using leads 31, 32. The leads 31, 32 may be soldered or adhered using a conductive adhesive or paste, for example, to the first and third terminal 41, 51. The leads 31, 32 may be formed by wires or as a flexible printed circuit (FPC), or the like. In another embodiment, metal leaf springs may be used to provide for an electrically conductive connection by clamping between the first and third terminal 41, 51 and the electric apparatus 30, for example. The electric apparatus 30 may be adhered to the fourth main surface 244 using a suitable adhesive 33, for example. If mounted on the exterior side of the transparent panel 20, the adhesive 33 may be enclosing the through hole 22 to provide for water tightness.

Although the third embodiment is illustrated to have the electrically conductive assembly arranged on the second main surface 232, in another embodiment, the conductive assembly may be arranged on the third main surface 243.

The leads 44, 54 may be thin wires or may be thin tracks, e.g. comprising a non-transparent conductive composition. Wires may be first adhered to the intermediate layer 25, which may be performed by applying the wires on the intermediate layer 25 in a heated state such that the wires locally melt the intermediate layer 25. Then, the first and second transparent panes 23, 24 may be adhered by the intermediate layer 25 using heat, pressure or both, thereby embedding the leads 44, 54 in the intermediate layer 25.

Figure 4A:
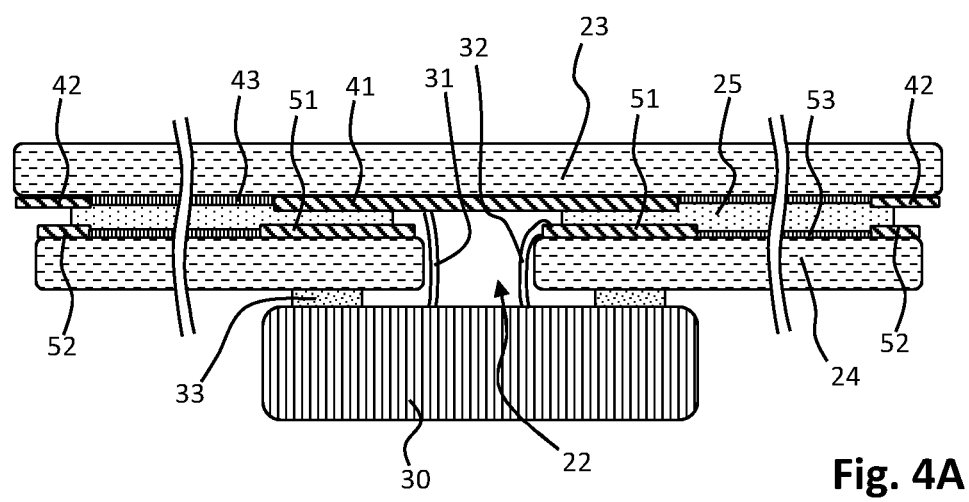
FIG. 4A shows a cross-section of a fourth embodiment of a transparent panel for use in a vehicle roof.
Figure 4B:
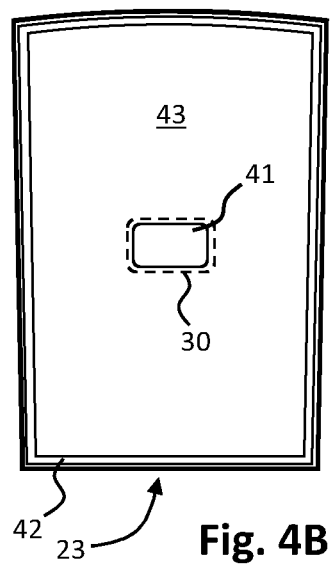
FIG. 4B shows a top view of a first transparent pane of the fourth embodiment of FIG. 4A.
Figure 4C:
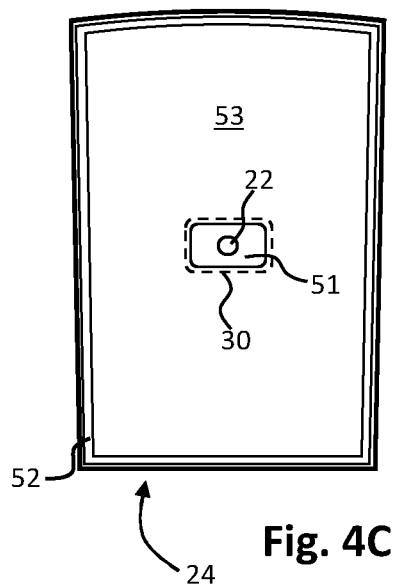
FIG. 4C shows a top view of a second transparent pane of the fourth embodiment of FIG. 4A.

FIGS. 4A-4C illustrate a fourth embodiment, wherein the electrically conductive assembly is partly arranged on the second main surface 232 and partly on the third main surface 243. As illustrated in FIGS. 4B and 4C, the second and fourth terminals 42, 52 are arranged along the periphery of the first and the second transparent panes 23, 24, respectively, while the first and third terminals 41, 51 are arranged in a central part thereof. In the second transparent pane 24, the through hole 22 is provided, which extends through the third terminal 51 as well as through the second transparent pane 24. The intermediate surface area 43, 53 is provided with a layer of an electrically conductive transparent composition, similar to the above first and the second embodiment. Due to the increased surface area 43, 53 and the increased length of the boundary between these surface areas 43, 53 and the first and third terminals 41, 51, respectively, a higher conductivity may be achievable or a thinner layer of the electrically conductive composition may suffice for the desired electrical current to be supplied to the electric apparatus 30.

It is noted that the fourth embodiment may additionally or alternatively be provided with a set of conductive leads as described above in relation to the third embodiment. However, care should be taken that leads on the second main surface 232 and leads on the third main surface 243 do not become visible in combination, e.g. due to minor misalignment caused by manufacturing tolerances when adhering the first and the second transparent pane 23, 24.

Figure 5A:
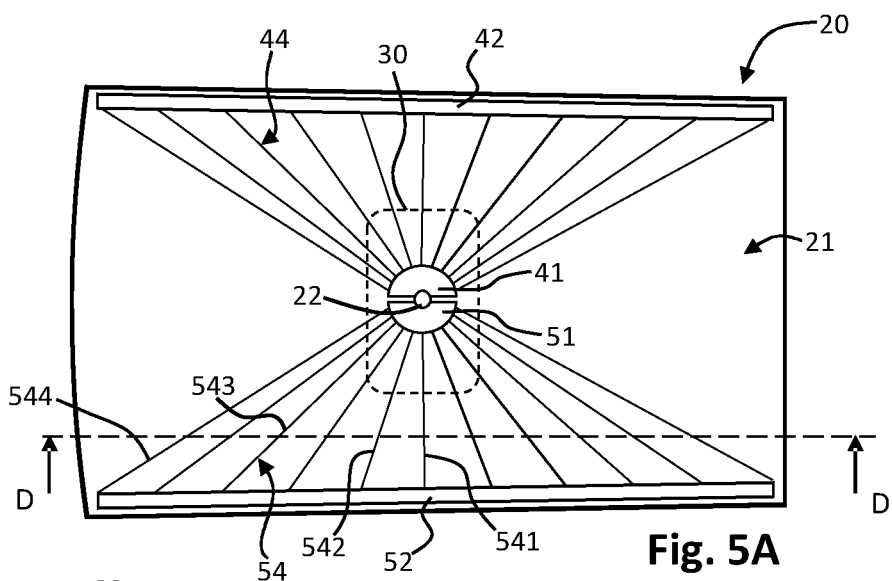
FIG. 5A shows a top view of a fifth embodiment of a transparent panel for use in a vehicle roof.
Figure 5B:
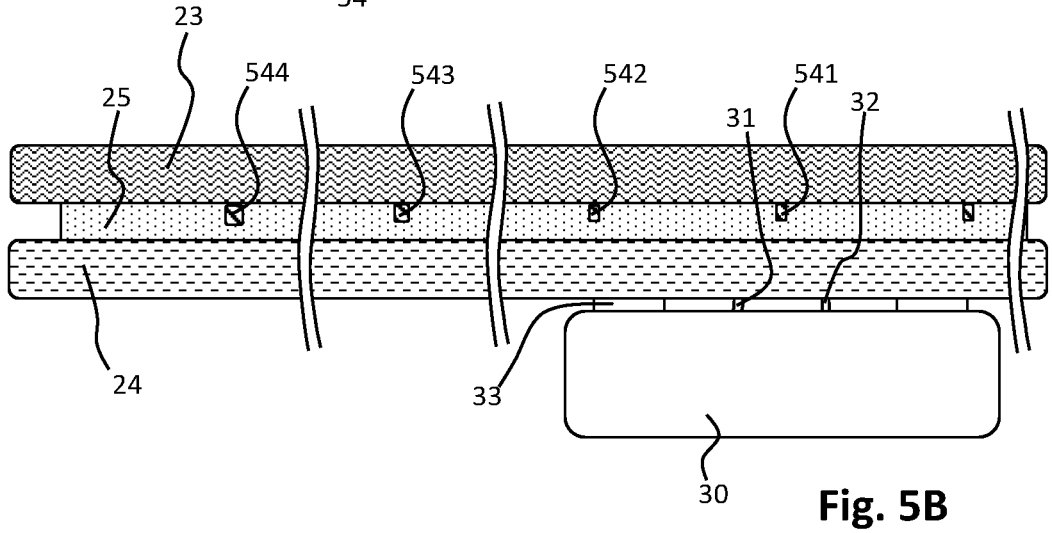
FIG. 5B shows a cross-section of the fifth embodiment of FIG. 5A.

FIGS. 5A and 5B illustrate a fifth embodiment, wherein a first set and a second set of leads 44, 54 are provided and are arranged in a star topology. The spacing of the leads 44, 54 near the first and third terminals 41, 51 is smaller than the spacing near the second and fourth terminals 42, 52. This may assist in reducing visibility as such. On the other hand, if the leads 44, 54 are slightly visible, it may appear as a design feature and may thus visually disappear in the background without attracting the attention of vehicle occupants.

FIG. 5B shows a cross-section along line D-D. As illustrated therein, shorter leads 541, 542 have a smaller cross-sectional surface than the longer lead 543 and the longest lead 544. Considering that a longer lead has a higher resistivity, resulting in a lower current with a same voltage, while at the same time considering that a local heat generation may be preferred to be equal along each lead 541, 542, 543, 544, the cross-sectional surface area or thickness of each lead may be adapted. Based on electric power generation theory, Ohm's law and Pouillet's law, the cross-sectional area of each of the set of leads 44, 54 may be proportional to its length squared. Still, other or additional considerations may lead to a different preferred relationship between the length and the cross-sectional area. For example, heat conductivity in the transparent panel, heat transfer to the surroundings, lead material composition and variation therein, and any other potentially relevant aspect and property may be taken into account.

In this fifth embodiment, the first transparent pane 23 is shown to be darkened or tinted as well known in the art. Such darkened or tinted pane may further reduce visibility of the leads 44, 54 due to decreased contrast. As apparent to those skilled in the art, such tinted or darkened transparent pane may be advantageously used in any of the above described embodiments as well. Instead of a darkened or tinted transparent pane 23, 24, the intermediate layer 25 may be tinted or darkened to achieve a same effect.

The electric apparatus as described herein may comprise any kind of function. For example, one or more sensors for monitoring an interior of the vehicle or for monitoring an exterior of the vehicle, a lighting function, a multimedia function like an audio and/or video player, a projector, or a central communication hub for external roof sensors like an antennae may be arranged in the electric apparatus.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A transparent panel for use in a vehicle roof of a vehicle, the transparent panel comprising:
 a layered stack comprising:
  a first transparent pane comprising a first main surface and a second main surface, opposite the first main surface;
  a second transparent pane comprising a third main surface, facing the second main surface, and a fourth main surface, opposite the third main surface, the second transparent pane comprising a through hole extending between the third and the fourth main surface; and
 an electrically conductive assembly arranged between the second and the third main surface, the electrically conductive assembly comprising:
  a first terminal arranged in a first area of the layered stack, the first area being adjacent to a circumferential edge of the through hole;
  a second terminal arranged in a second area of the layered stack, the second area being adjacent to a circumferential edge of the transparent panel; and
  a visually-transparent conductive layer electrically coupling the first terminal and the second terminal and being arranged in an intermediate area of the layered stack, the intermediate area being adjacent to the first and the second area, wherein the visually-transparent conductive layer of the electrically conductive assembly comprises two or more electrically conductive leads, the two or more electrically conductive leads extending between the first terminal and the second terminal, wherein a cross-section of the two or more electrically conductive leads has a width that is smaller than about 100 micrometres, the width of the two or more electrically conductive leads extending in parallel to the second main surface, wherein the two or more electrically conductive leads comprises a first lead and a second lead, wherein the first lead is shorter than the second lead and wherein an electrical resistance of the first lead is higher than an electrical resistance of the second lead;
  wherein the intermediate area has an optical transmissivity higher than an optical transmissivity of the first area and optionally higher than an optical transmissivity of the second area; and
 an electric apparatus mounted on the fourth main surface covering the through hole and first area, the electric apparatus being electrically coupled to the electrically conductive assembly through the through hole.

2. The transparent panel according to claim 1, wherein the first terminal has a first conductance per unit area and the visually-transparent conductive layer has a second conductance per unit area, the first conductance per unit area being higher than the second conductance per unit area.

3. The transparent panel according to claim 1, wherein the first terminal comprises a first boundary at a circumferential edge of the through hole and a second boundary with the visually-transparent conductive layer, wherein a length of the second boundary is larger than a length of the first boundary.

4. The transparent panel according to claim 1, wherein
 the electrically conductive assembly comprises a third terminal arranged in a third area of the layered stack and a fourth terminal arranged in a fourth area of the layered stack, the fourth area being adjacent to a circumferential edge of the transparent panel; and
 the visually-transparent conductive layer comprises a first conductive layer section and a second conductive layer section, the first and the second conductive layer sections being electrically isolated from each other, wherein
  the first conductive layer section electrically couples the first and the second terminal and is arranged in a first intermediate subarea; and
  the second conductive layer section electrically couples the third and the fourth terminal and is arranged in a second intermediate subarea,
  wherein each of the first and second intermediate subareas has an optical transmissivity higher than an optical transmissivity of each of the first and third areas, and optionally higher than an optical transmissivity of each of the second and fourth areas.

5. The transparent panel according to claim 4, wherein the through hole is a plurality of through holes comprising a first through hole and a second through hole, wherein the first terminal is arranged adjacent to the first through hole and wherein the third terminal is arranged adjacent to the second through hole.

6. The transparent panel according to claim 1, wherein the layered stack further comprises an intermediate layer between the second main surface and the third main surface for adhering the first transparent pane and the second transparent pane and wherein
 the first terminal and the second terminal are arranged on the second main surface;
 the electrically conductive assembly comprises a third terminal and a fourth terminal, the third and fourth terminals being arranged on the third main surface; and
 the visually-transparent conductive layer comprises a first conductive sublayer arranged on the second main surface and a second conductive sublayer arranged in the third main surface, the first and the second conductive sublayers being electrically isolated from each other by the intermediate layer, wherein the first conductive sublayer electrically couples the first terminal and the second terminal; and the second conductive sublayer electrically couples the third terminal and the fourth terminal.

7. The transparent panel according to claim 6, wherein the through hole is a plurality of through holes comprising a first through hole and a second through hole, wherein the first terminal is arranged adjacent to the first through hole and wherein the third terminal is arranged adjacent to the second through hole.

8. The transparent panel according to claim 1, wherein the transparent panel is configured to be installed in a vehicle, wherein when installed, the transparent panel has a panel width extending perpendicular to a main driving direction of the vehicle, wherein the electric apparatus is arranged in a center of the panel width and wherein at least a part of the transparent panel adjacent to the electric apparatus in the panel width direction is uncovered by the electric apparatus.

9. The transparent panel according to claim 1, wherein at least one of the first transparent pane and the second transparent pane is tinted.

10. A transparent panel for use in a vehicle roof of a vehicle, the transparent panel comprising:

a layered stack comprising:

a first transparent pane comprising a first main surface and a second main surface, opposite the first main surface;

a second transparent pane comprising a third main surface, facing the second main surface, and a fourth main surface, opposite the third main surface, the second transparent pane comprising a through hole extending between the third and the fourth main surface; and an electrically conductive assembly arranged between the second and the third main surface, the electrically conductive assembly comprising:

a first terminal arranged in a first area of the layered stack, the first area being adjacent to a circumferential edge of the through hole;

a second terminal arranged in a second area of the layered stack, the second area being adjacent to a circumferential edge of the transparent panel;

a third terminal arranged in a third area of the layered stack;

a fourth terminal arranged in a fourth area of the layered stack, the fourth area being adjacent to the circumferential edge of the transparent panel; and a visually-transparent conductive layer comprising a first conductive layer section and a second conductive layer section, the first and the second conductive layer sections being electrically isolated from each other, wherein the first conductive layer section electrically couples the first terminal and the second terminal and is arranged in a first intermediate subarea; and the second conductive layer section electrically couples the third terminal and the fourth terminal and is arranged in a second intermediate subarea, thus providing an anode connection and a cathode connection;

wherein each of the first and second intermediate subareas has an optical transmissivity higher than an optical transmissivity of each of the first and third areas, and optionally higher than an optical transmissivity of each of the second and fourth areas; and an electric apparatus mounted on the fourth main surface covering the through hole and first area, the electric apparatus being electrically coupled to the electrically conductive assembly through the through hole.

11. The transparent panel according to claim 10, wherein the through hole is a first through hole of a plurality of through holes further comprising a second through hole, and the first terminal is arranged adjacent to the first through hole, and wherein the third terminal is arranged adjacent to the second through hole.

12. The transparent panel according to claim 10, wherein the layered stack further comprises an intermediate layer between the second main surface and the third main surface for adhering the first transparent pane and the second transparent pane and wherein the first terminal and the second terminal are arranged on the second main surface;

the third terminal and the fourth terminal are arranged on the third main surface; and the first conductive layer section is a first conductive sublayer arranged on the second main surface and the second conductive layer section is a second conductive sublayer arranged on the third main surface, wherein the first and second conductive sublayers are electrically isolated by the intermediate layer.

13. The transparent panel according to claim 12, wherein the through hole is a first through hole of a plurality of through holes further comprising a second through hole, and the first terminal is arranged adjacent to the first through hole, and wherein the third terminal is arranged adjacent to the second through hole, wherein the first terminal is arranged adjacent to the first through hole, and wherein the third terminal is arranged adjacent to the second through hole.

14. The transparent panel according to claim 10, wherein the visually-transparent conductive layer comprises a transparent electrically conductive composition.

15. A transparent panel for use in a vehicle roof of a vehicle, the transparent panel comprising:

a layered stack comprising:

a first transparent pane comprising a first main surface and a second main surface, opposite the first main surface;

a second transparent pane comprising a third main surface, facing the second main surface, and a fourth main surface, opposite the third main surface, the second transparent pane comprising a through hole extending between the third and the fourth main surface; and an electrically conductive assembly arranged between the second and the third main surface, the electrically conductive assembly comprising:

a first terminal arranged in a first area of the layered stack, the first area being adjacent to a circumferential edge of the through hole;

a second terminal arranged in a second area of the layered stack, the second area being adjacent to a circumferential edge of the transparent panel;

a third terminal arranged in a third area of the layered stack;

a fourth terminal arranged in a fourth area of the layered stack, the fourth area being adjacent to the circumferential edge of the transparent panel;

a fifth terminal arranged in a fifth area of the layered stack;

a sixth terminal arranged in a sixth area of the layered stack, the sixth area being adjacent to the circumferential edge of the transparent panel;

a seventh terminal arranged in a seventh area of the layered stack; and an eighth terminal arranged in an eighth area of the layered stack, the eighth area being adjacent to the circumferential edge of the transparent panel;

a visually-transparent conductive layer comprising a first conductive layer section, a second conductive layer section, a third conductive layer section, and a fourth conductive layer section, the first, second, third, and fourth conductive layer sections each being electrically isolated from each other, wherein the first conductive layer section electrically couples the first and the second terminal and is arranged in a first intermediate subarea; and the second conductive layer section electrically couples the third and the fourth terminal and is arranged in a second intermediate subarea;

the third conductive layer section electrically couples the fifth and the sixth terminal and is arranged in a third intermediate subarea;

the fourth conductive layer section electrically couples the seventh and the eighth terminal and is arranged in a fourth intermediate subarea;

wherein the each of the first intermediate subarea and the second intermediate subarea is larger in area than each of the third intermediate subarea and the fourth intermediate subarea;

wherein each of the first, second, third, and fourth intermediate subareas comprises an optical transmissivity higher than an optical transmissivity of each of the first, third, fifth, and seventh areas, and optionally higher than an optical transmissivity of each of the second, fourth, sixth, and eighth areas; and an electric apparatus mounted on the fourth main surface covering the through hole and first area, the electric apparatus being electrically coupled to the electrically conductive assembly through the through hole.

16. The transparent panel according to claim 15, wherein the through hole is a first through hole of a plurality of through holes further comprising a second through hole and a third through hole, wherein the first terminal is arranged adjacent to the first through hole, the third terminal is arranged adjacent to the second through hole, and each of the fifth terminal and the seventh terminal is arranged adjacent to the third through hole.

17. The transparent panel according to claim 15, wherein the first terminal and the third terminal are configured to provide a supply voltage and a corresponding supply current; and the fifth terminal and the seventh terminal are configured to provide input or output of an electrical signal.

18. The transparent panel according to claim 17, wherein the electrical signal is a control signal for controlling operation of the electric apparatus or a sensor signal generated by a sensor in the electric apparatus.

19. The transparent panel according to claim 15, wherein electrically conductive assembly is arranged on the second main surface or the third main surface.

20. The transparent panel according to claim 15, wherein the visually-transparent conductive layer comprises a transparent electrically conductive composition.

\* \* \* \* \*